H. O. TROWBRIDGE.
PITMAN WHEEL FOR REAPING AND MOWING MACHINES.
APPLICATION FILED MAR. 13, 1909.
970,140. Patented Sept. 13, 1910.
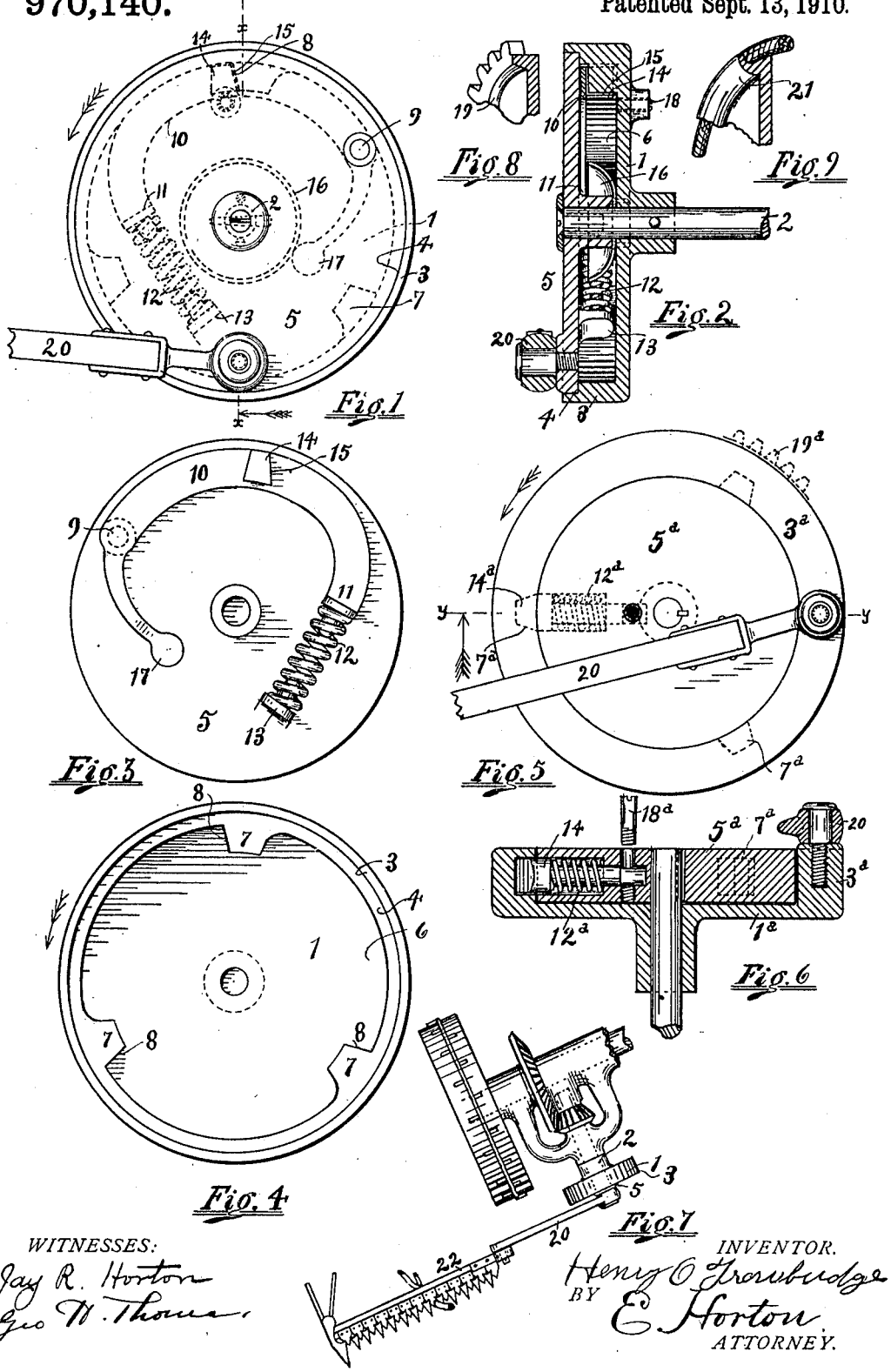

UNITED STATES PATENT OFFICE.

HENRY O. TROWBRIDGE, OF MILLERTON, PENNSYLVANIA.

PITMAN-WHEEL FOR REAPING AND MOWING MACHINES.

970,140.  Specification of Letters Patent. Patented Sept. 13, 1910.

Application filed March 13, 1909. Serial No. 483,337.

*To all whom it may concern:*

Be it known that I, HENRY O. TROWBRIDGE, citizen of the United States, residing at Millerton, in the county of Tioga and State of Pennsylvania, have invented certain new and useful Improvements in Pitman-Wheels for Reaping and Mowing Machines, of which the following is a specification.

My invention relates to wheels for transmitting power through medium of a pitman, gear, or belt, as a common means in its application for different machines, but in the present instance the object of my invention is to so arrange the mechanisms to be more particularly suited to the driving of the section knives in a reaping or mowing machine, and which will impart the power by a pitman wheel, and by a pitman up to a certain degree of resistance when it may cease its driving power without cessation of the wheel proper, or the application of the power being given to the wheel, and will, if desired, produce an alarm to the operator, until the obstruction or resistance to the co-operated parts be removed. In this instance the purpose being to prevent breakage of the knife sections of the reaper or mower when meeting an obstruction, while under other circumstances if it be a geared connection from the wheel parts to any mechanism, to serve a like preserving purpose.

The further advantages of my invention will appear in the following description, and the novel features thereof will be particularly pointed out in the claims. Like figures representing like parts.

Figure 1 is an elevation of the front side of the complete wheel. Fig. 2 is a vertical cross section of the wheel in direction of the arrow on the line X X Fig. 1. Fig. 3 is a detailed view of the inside side of the crank carrying disk, showing the clutch lever with its spring in full view as arranged to lie flatly against the crank disk. Fig. 4 is a front side view of the driving wheel with the crank disk part removed, showing its internal projecting driving lugs. Fig. 5 is a view in elevation of a modified form of wheel in which the active parts are generally reversed, that is, the crank disk becomes the outside wheel casing and the driving wheel is arranged within and secured to the shaft flush with the rim face of the crank wheel, which is journaled loosely on the shaft. Fig. 6 is a transverse section of Fig. 5 on the line indicated by Y Y looking in direction of the arrow. Fig. 7 is a plan view illustrative of the application of the wheel to parts of a reaping or mowing machine with an obstructive element wedged within the knife guards. Fig. 8 is a sectional sketch to illustrate how the peripheral part of the crank disk may be formed to carry a gear, by means of which a geared connection with the wheel could be made applicable when desired in place of the pitman. Fig. 9 is a similar sketch in departure for the crank disk when a wire or rope belt connection is desired. The dotted lines in Fig. 5 show also how the modified form of wheel may also carry teeth on its peripheral face for such other purposes as desired dispensing with the pitman.

Referring to the drawings, 1, represents a wheel rigidly affixed to its shaft 2, and in form of cross section having a center hub extending rearward, and at its periphery a face flange 3 extending forward, thus forming a cup shaped disk or shell of about equal thickness, excepting at the front of the rim 3, where a portion of said rim is cut away or rabbeted out internally at 4, to receive therein a secondary wheel or crank disk 5, provided with an inwardly extending hub and loosely journaled on the shaft, thus forming an open chamber 6 between the two wheel members, of which the first or driving member 1 principally incases on the back and rim sides. On the inner side of the rim 3, and extending into the chamber as thus formed, and as a fixed portion of the wheel member 1, is extended the lugs 7, said lug or lugs, there being one or more provided as may be desired, are formed to provide a face side or shoulder 8 fitted to a plane in direction of the wheel axis, but pitching more or less away inwardly from a radial line adverse in direction of the wheel's rotation.

Lying flat on the inside of the crank disk 5, and pivoted thereto by a rigidly affixed stud 9 from it projecting through the disk, is a lever 10, which is curved edgewise and extended about half way around the disk where its free end 11 is shortly offset and seated on a spring 12 acting to press the lever outward, said spring being compressed against the lever with its other end seated on a shelf 13 projecting inwardly from the disk the lever and spring being so located as to come into the open chamber of the wheel, where it will act with freedom and without conflict at such times when the wheel members are not rotating together. About midway of its free end and pivot, said lever is provided with a lug 14 extending therefrom into the chamber of the wheel, and having a face or shoulder side 15 of like inclination and surface to act in contact with the faces 8 of the lugs of the wheel. Thus it will be seen, that whatever power of rotation is given the crank disk, will be governed by the inclination of the face or faces of the lugs, and the amount of pressure on the lever given by the spring, against the action of which, only, can the lug 7 of the driving wheel pass by the lug 14 of the lever, the inclination of the lug faces forcing the lever to swing inward and pass by whenever the crank disk and its coöperative machinery are sufficiently obstructed.

Between the hub of the crank disk and the wheel, and secured to the latter, with a center hole through which the shaft passes, is arranged a bell 16 curved outwardly into the free space of the chamber, and projecting closely to its outer periphery in the form of a hammer to strike the bell, is the inwardly curved end 17 of the lever 10, which is extended beyond its pivoted part for the purpose, so whenever the lug of the lever is forced to pass over and by the driving lug, the hammer 17 will be quickly oscillated to strike upon the bell, by the spring on the opposite free end of the lever.

It may be here stated that the bell is not a necessary factor in the operation of the invention, but is shown in connection as a useful simple and convenient factor in notifying the driver or operator the moment any obstruction overpowers the spring and frictional contact between the lugs and causes the crank disk to cease revolution while the driving wheel member may continue to rotate.

In case it be desired to lock the crank disk with the driving member of the wheel, making them inoperative with each other excepting as they rotate in union and give to the crank disk the same force in revolution as has the driving wheel, I have provided the locking screw 18, so located in a projecting boss of the driving wheel on its rearward side, that it may be screwed through into the within chamber sufficiently to extend in over the lug 14 of the lever, and hold the same from any movement inward and thus locking the lugs and the two wheels into constant operative union.

19 represents a section of gear to illustrate how the crank disk 5 may be provided with such a gear at its periphery as applicable to intermesh with other gearing in the distribution of the wheel power in such other instances as when the pitman 20 will improperly perform as such distributing medium.

A similar purpose of departure for the crank disk is illustrated at 21, excepting that it provides for rope transmission as an operative means.

Referring to Figs. 5 and 6 I have chosen to illustrate a modified form or arrangement of the wheel having in effect a like purpose as a pitman wheel for reapers or mowers, and like adaptable to any such of the other purposes of transmission as illustrated in my former wheel. In this wheel instead of the first member $1^a$ being secured to the shaft as the driver, it is loosely journaled thereon, and in front of it rigidly affixed to the shaft is the driving member $5^a$ filling the chamber space within the rim $3^a$, which is sufficiently thickened on its face edge to carry the crank pin, thus the outer wheel becomes the secondary member and acts as the crank disk, and is driven by the bevel ended bolt $14^a$, radially seated, and spring actuated, to project from the peripheral edge of the driver wheel into one or more suitable beveled openings $7^a$, made into the internal side of the rim of the outer wheel, and by which bolt it is driven, until sufficiently resisted to cause the bolt to slide inward against the action of its spring $12^a$, when the crank will stop and the driver continue to rotate in like manner as the other wheel. The method of locking the two wheels together is accomplished in a similar manner as in the other wheel, by the inserting of the screw $18^a$ through the driving disk to come in the path of the inner end of the bolt, and thus prevent its inward movement. The dotted lines representing teeth $19^a$ in Fig. 5 are to represent how the periphery of the crank wheel may be made into a gear for purposes identical as heretofore described for the crank disk part of the other wheel.

Referring to Fig. 7 I have illustrated how the knives of a reaper or mower frequently become obstructed by some unseen substance, so that if the machine is not stopped at once, the knives or their guards become broken through the whole power of the machine being applied to the knife bar 22, when a pitman and wheel is not provided with such operative means as I have described in my wheel, that will cease to drive before imparting to the pitman the full power of the machine.

Having thus fully described my invention, what I claim and wish to secure by Letters Patent is:—

1. In a reaper or mowing machine, in combination, a rotary pitman shaft, a wheel member on the shaft positively rotated thereby, a secondary wheel member loosely journaled on the pitman shaft, a cutter bar, a pitman connecting the cutter bar to the loosely journaled wheel, means for interlocking the two wheel members to drive the cutter bar, and means whereby the resistance from the cutter bar when obstructed will disengage the two wheel members.

2. In a reaper or mowing machine, in combination, a rotary crank shaft, a wheel fixed on the shaft composed of driving and driven members, the driven wheel member having a spring actuated lever and crank-pin attached to it, a cutter bar with means for connecting it to the crank-pin, a shoulder provided on the lever, having an inclined face, and a shoulder provided on the driving wheel, for slip engagement with the shoulder of the lever.

3. In a reaper or mowing machine, the combination with the cutter bar and pitman shaft, of a wheel composed of driving and driven members having a chambered space between them, a bell fixed on the shaft within the chamber, a spring actuated lever with hammer for ringing the bell, and means for engaging the lever to drive the cutter bar through the medium of the driven wheel member.

4. In a reaper or mowing machine, the combination with the cutter bar and crank wheel shaft, of a wheel composed of a driving wheel case and an inner disk having a chambered space between them, a bell fixed on the shaft within the chamber, a spring actuated lever with bell hammer carried by the disk and fixed to ring the bell and to engage with the outer wheel case, and a locking bolt arranged to project into the chamber to engage the lever and lock it whenever its permanent engagement for rotation with the crank wheel and shaft is desired.

In testimony whereof I affix my signature in presence of two witnesses.

HENRY O. TROWBRIDGE.

Witnesses:
JOHN D. BRANDT,
WALLACE W. SEELEY.